United States Patent [19]

Rando

[11] Patent Number: 4,862,583
[45] Date of Patent: Sep. 5, 1989

[54] METHOD OF MAKING A FIBER-OPTIC REED SWITCH

[75] Inventor: Joseph D. Rando, Dudley, Mass.

[73] Assignee: Imo Industries, Inc., Princeton, N.J.

[21] Appl. No.: 298,642

[22] Filed: Jan. 18, 1989

Related U.S. Application Data

[62] Division of Ser. No. 146,196, Jan. 20, 1988.

[51] Int. Cl.[4] .................. G01H 11/00; H01H 11/00
[52] U.S. Cl. ...................................... 29/602.1; 29/622
[58] Field of Search .............................. 29/602.1, 622;
335/151–154

[56]  References Cited

U.S. PATENT DOCUMENTS 4,177,439 12/1979 Smith .................................. 335/151
4,347,658 9/1982 Head .................................. 29/602.1

Primary Examiner—Carl E. Hall

Attorney, Agent, or Firm—Hopgood, Calimafde, Kalil, Blaustein & Judlowe

[57]  ABSTRACT

A magnetically responsive reed switch assembly having one or two cantilevered reed members arranged to close and open a gap responsive to respective levels of magnetic exposure, supports two optical fiber members in end-to-end closely spaced confrontation with the common axis alignment or misalignment of the fibers being a function of the relative closed or opened gap condition. A convenient method of fabrication involves mounting opposing cantilevered reed members on a substrate which is bent to bring the reed members closer together longitudinally. While so bent, a gap closing magnetic field is generated and a continuous length of optical fiber is bonded to the flat aligned surfaces of the reed assembly. The fiber is scored, broken at scoring, and stress and magnetic field is relieved, whereupon fiber ends shift laterally to produce open circuit condition.

5 Claims, 1 Drawing Sheet

U.S. Patent  Sep. 5, 1989  4,862,583
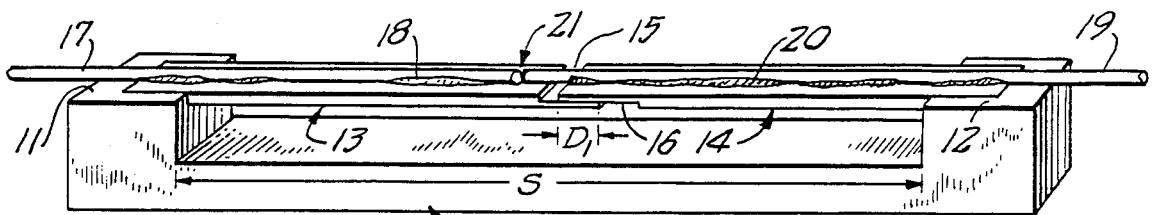
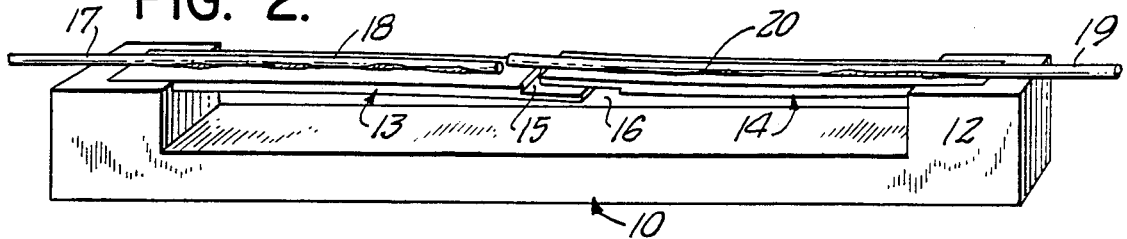
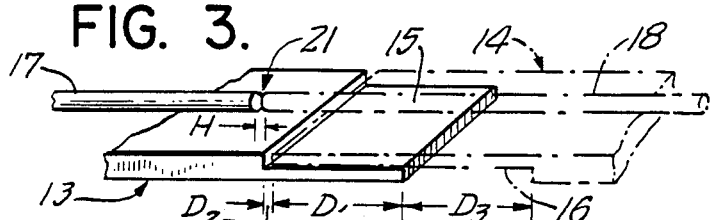
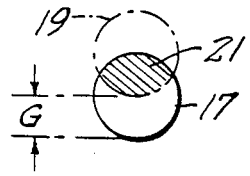
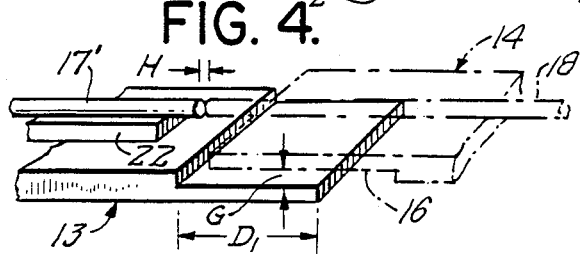
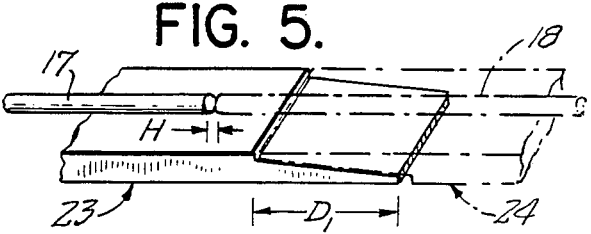
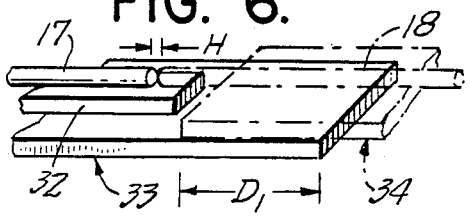
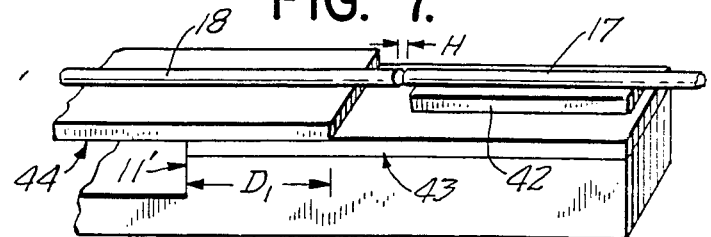
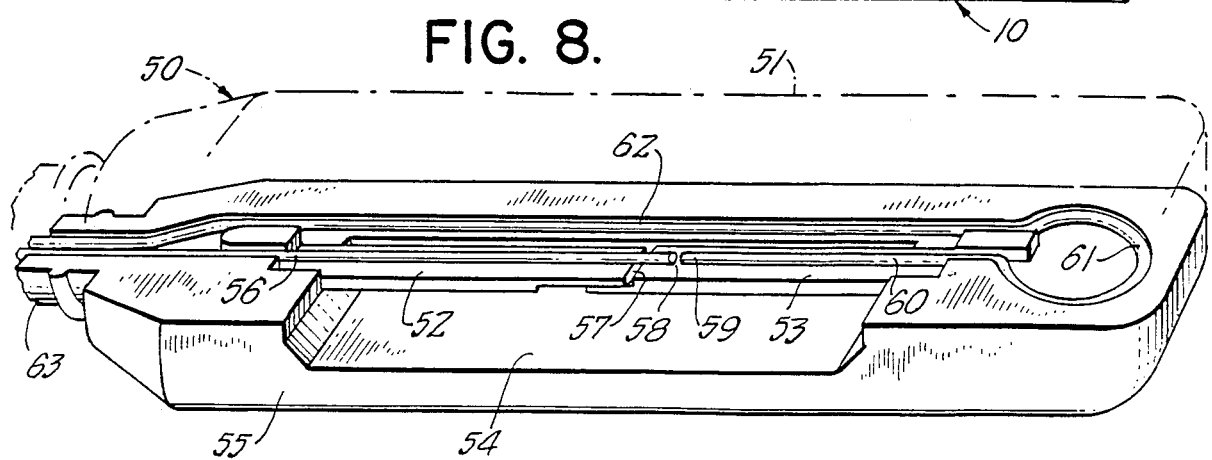

4,862,583

METHOD OF MAKING A FIBER-OPTIC REED SWITCH

This is a division of copending application Ser. No. 146,196, filed Jan. 20, 1988.

BACKGROUND OF THE INVENTION

The inventoin pertains to magnetically sensitive switching means for optical-fiber circuitry.

Many schemes for fiber-optic switches have been proposed over the last few years. Most of these have been aimed at the telecommunications and data-communications markets, which means that they switch one fiber between two other fibers for the purpose of redirecting information flow. These devices tend to be expensive and require electrical energy to cause switching.

BRIEF STATEMENT OF THE INVENTION

It is an object of the invention to provide improved fiber-optic switching means which does not require electrical energy for its actuation.

It is a specific object to provide an on/off fiber-optic switching means of the character indicated.

It is also a specific object to meet the above object with fiber-optic switching means which is actuated by local presence of a magnetic field of predetermined strength and orientation.

Another specific object is to employ magnetic-reed elements for the switching of optical fibers and thus, among other things, allow for a continuous monitoring of the line integrity of fiber-optic systems, all in replacement of electrical systems which currently use standard reed switches.

It is a general object to meet the above objects with structures and methods of manufacture which are basically simple, accurate and inexpensive.

The invention achieves the foregoing objects by providing for the magnetically switched alignment or misalignment of the confronting adjacent ends of two optical fibers, as distinguished from the current practice of switching one fiber between positions of alignment with one or the other of two further fibers. Thus, switches of the invention can be used to determine the absence or presence of a magnetic field. A permanent magnet moved into a predetermined positional relationship can actuate the switch, but no electrical energy is required unless the electrical energy is to be used to generate the actuating magnetic field, as in an electromagnet. By so arranging that the switched states are between (a) optical-fiber alignment and (b) only partial misalignment, it is possible always to pass at least a small amount of light and thus to provide for monitoring line integrity of a fiber-optic circuit.

In the currently preferred method of manufacture of a fiber-optic reed switch of the invention, no aligning of optical fibers is required, since assembly proceeds using a single optical fiber which is severed into two correctly aligned fibers only after the step of bonding the single fiber to each of two paramagnetic reed elements. Consequently, no fiber-alignment features are needed either on the reeds or on substrate structure for mounting the reeds.

BRIEF DESCRIPTION OF THE DRAWINGS

The invention will be described for various illustrative embodiments, in conjunction with the accompanying drawings, in which:

FIGS. 1 and 2 are like simplified generally isometric views of a fiber optic switch of the invention, respectively showing closed and open conditions of the switch;

FIG. 2A is a diagram to greatly enlarged scale, to show the reduction in optical transmission for the open-switch condition of FIG. 2;

FIG. 3 is a fragmentary view of coacting portions of the switch of FIG. 1, to permit discussion of dimensional relationships;

FIGS. 4, 5, 6 and 7 are views similar to FIG. 3 to show modifications; and

FIG. 8 is an isometric view in greater detail to show a presently preferred embodiment of a complete article of manufacture.

DETAILED DESCRIPTION OF THE PRESENTLY PREFERRED EMBODIMENTS

In FIGS. 1 and 2, a fiber-optic switch of the invention is shown to comprise a magnetically transparent base or substrate 10 having two upstanding pedestals 11–12 which are longitudinally spaced by a distance or span S. A first elongate paramagnetic reed element 13 is mounted as a cantilever, being achored at one end to the pedestal 11, with its other end projecting toward pedestal 12; and a second elongate paramagnetic reed element 14 is similarly mounted to pedestal 12, being cantilevered in the direction of pedestal 11. The respective cantilevered ends of elements 13–14 have longitudinal overlap, to the extent $D_1$, at a central location in the span S. Reed elements 13–14 are of like rectangular section, and their overlapping ends are stepped to half thickness, the step 15 of reed 13 facing up and the step 16 of reed 14 facing down, so that for the closed condition shown in FIG. 1, the upper surfaces of both reed elements are in the same plane. A first length 17 of optical fiber is bonded by adhesive 18 to the upper surface of reed 13, and a second length 19 of optical fiber is similarly bonded by adhesive 20 to the upper surface of reed 14. As shown, length 17 terminates short of the upwardly facing step 15, and length 19 projects beyond the end of the downwardly facing step 16 and into short stabilizing overlap with the full thickness of reed element 13, the adjacent ends of fiber lengths 17-18 being in closely spaced confronting registry when in the switch-closed relation of FIG. 1.

The switch-open relation of FIG. 2 is characterized by a transverse gap or offset G at the region of overlap of the ends of reeds 13–14, between the overlapping faces of the steps 15–16; in this condition, the adjacent fiber ends are no longer in register but have been misaligned to the extent G, shown in FIG. 2A, so that light transmission from one to the other of fiber lengths 17–19 is substantially reduced, as approximately to the shaded area 21 shown in FIG. 2A.

When in the presence of a magnetic field wherein the elongation axes of the reed elements have a material component of alignment with lines of force in the magnetic field, the respective confronting surfaces of the stepped and overlapped ends of the reed elements assume a North and South pole-face relation, and if the magnetic field is of sufficient strength, these poles will attract to close the gap G, against the resistive-force of compliantly bending elements 13-14 into gap-closing contact with each other. Thus, the gap-closed relation of FIG. 1 reflects the suitably oriented environmental presence of a sufficient strong magnetic field, and the gap-open relation of FIG. 2 reflects the insufficient strength or unsuitable alignment of any environmental magnetic field. Of course, in the switch-closed FIG. 1 relation, both fibers 17 and 19 are aligned for maximum light transmission from a source input (not shown) for one fiber, to a photocell (not shown) for response to light output of the end of the other fiber; and in the gap-open condition of FIG. 2, there will still be light transmission from source to photocell, but at much-reduced intensity.

The diagram of FIG. 3 is useful in identifying certain dimensional and other relationships for what has been described. Generally, the rectangular section of the reed elements should involve a width-to-thickness (W:T) ratio of at least 2:1, a 3:1 to 5:1 ratio being preferred. The reed-overlap region $D_1$ is in the range of 1 to 5 percent of the longitudinal span S of cantilevered-reed extent. More specifically, for a presently preferred situation (a) wherein each of the reed elements is a flux-conducting nickel-iron alloy known as "CO-NETIC B", available from Magnetic Shield Corporation, Bensenville, Ill., (b) wherein each of the reed elements is cantilevered to the extent of 1.50 inches to cover a span S of 1.465 inches and are of 0.025-inch thickness and 0.095-inch width, and (c) wherein the glass fiber is a standard data-communication transmission-line product of American Telephone and Telegraph Company, having a 62.5-micron core diameter with cladding to 125-micron diameter; the transverse gap G is 0.001 to 0.0015 inch; the longitudinal gap H between adjacent reeds of glass fibers 17-19 is 0.0005 inch; the overlap $D_1$ is 0.035 inch, the longitudinal clearance $D_2$ of the end of reed element 14 to the full-thickness shoulder of reed element 13 is 0.010 inch; and the longitudinal clearance $D_3$ of the end of reed element 13 to the full-thickness shoulder of reed element 14 is 0.125-inch.

The described structure is prepared by first securely mounting the reed elements 13-14 to their respective pedestals, in the environmental circumstance of no actuating magnetic field, such that the gap G is precisely defined. Thereafter, and in the case of base 10 having a modicum of stiffly compliant yieldability, bending force is applied downward to the longitudinal center of base 10 and upward at each of the pedestals 11-12, thus blowing the base 10 and slightly tipping the pedestals toward each other, increasing the longitudinal overlap of the reed ends, by the incremental distance H. The reeds are then exposed to a magnetic field of sufficient strength to bring the lapped reed ends into gap-closing relation, at which point the upper surfaces of both reed elements are in essentially a common plane. A single elongate optical fiber is then laid upon the flat upper surfaces of the reeds, and adhesive (18, 20) is then applied and allowed to set. The adhesive is suitably UNI-SET UV-311, a fast-curing low-viscosity adhesive with wetting properties, curing being accelerated in the presence of ultraviolet light; UV-311 is a product of Emerson & Cuming, a W. R. Grace company. When the adhesive has cured, a scoring is applied to the fiber to establish a fracture location 21; fracture occurs at 21 when the magnetic field is removed and the reeds are forced to separate by applying an upward force on reed 14. Bending stress on page 10 is then removed, and base 10 restores itself to unstressed condition. The now-separate fibers 13-14 have closely spaced ends, at longitudinal separation H, and these ends will align in the presence of a sufficient magnetic field. What has been described is a completed and useful switching device, but for commercial purposes it is desirable to additionally provide for external optical-circuit connections, as by using AT&T standard connectorss (ST-Series Multimode Fiber Optic Connectors) and by enclosing or by integrating the assembly of FIG. 1 into a light-tight enclosure (not shown).

The diagram of FIG. 4 illustrates use of the reed and base structure of FIGS. 1 to 3 in application to a fiber-optic switch of normally closed variety. Thus, in FIG. 4, for the depicted unactuated condition wherein gap G exists at the region of reed-end overlap, a precision shim 22 is bonded to the upper surface of reed element 13, so that fibers 17' and 18 can have registering closely adjacent ends when gap G exists. Upon actuation in the presence of a sufficient magnetic field, the gap G reduces to zero and a substantially reduced optical coupling results, as depicted in FIG. 2A.

The diagram of FIG. 5 illustrates a modification involving complimentary wedge or slopoing notch formation of the magnetic-reed ends 23-24 at their region $D_1$ of overlap. Optical fibers 17-18 are mounted to reeds 23-24 in the manner described for FIG. 1 or FIG. 4, depending upon whether the switch is to be of normally open or normally closed variety.

In the arrangement of FIG. 6, the lapped ends of reed elements 33-34 are of full read thickness, i.e., not notched. For the depicted gap-closed (actuated) condition, a shim 32 bonded to reed element 33 positions its fiber 17 for aligned registration with the adjacent end of fiber 18. When gap G is allowed to develop, i.e., in absence of an actuating magnetic field, a light-transmitting relation as depicted in FIG. 2A is established.

In the arrangement of FIG. 7, the magnetic equivalent 43 of one of the reed elements has no cantilever suspension; it has no free end and is fixedly mounted to one (11') of the pedestals of base 10. The other reed element 44 is the only cantilevered member and will be understood to be mounted to the other pedestal 12 (not shown in FIG. 7) and to extend for the full span S, plus the region of overlap $D_1$ with the fixed paramagnetic element 43. For the actuated position shown for the normally open switch of FIG. 7, a shim 42 bonded to element 43 positions firber 17 in aligned registration with the fiber 18 that is mounted to reed element 44. When in its normally open position, involving a gap G between elements 43-44 at region $D_1$, the reduced light-transmitting capability is again as illustrated in FIG. 2A.

Referring now to FIG. 8, there is shown a fully encapsulated embodiment 50, the upper portion of the case 51 being shown in phantom lines for revealing the inner construction wherein reed members 52 and 53, constructed as described with reference to FIG. 1, are mounted cantilever fashion over a longitudinal recess 54 in the bottom half 55 of the case 50. An optical fiber 56 enters the case 50 and is bonded to reed 52, briding the half thickness longitudinal inter-reed separation 57 and terminating at small gap 58 confronting the opposing end 59 of the fiber continuation 60, bonded to reed 53, then looping around in channel 61 to return via longitudinal channel 62 to the terminal end 63 of the case 50. Optical connections can then be made to the optical fibers at the terminal end 63 in any known manner. It is to be understood that FIG. 8 shows the switch in circuit closed condition, the circuit being "opened" by inducing a transverse separation or gap between the overlapped ends of reeds 52 and 53 to cause misalignment of the optical fibers as illustrated in FIG. 2A. The open circuit can be brought about by decreasing the magnetic field strength, it being assumed that the FIG. 8 condition is induced by the presence of a magnetic field.

What is claimed is:

1. The method of making an optical-fiber switch (a) wherein two longitudinally upstanding pedestals are mounted to an elongate base which is stiffly compliant and which is therefore adapted for transient bending deformation, (b) wherein two separate elongate reed elements of rectangular section have cantilevered mounting to each of said pedestals with notched reduction to substantially one half their respective rectangular sections at a central region of cantilevered ends of said reed elements, (c) wherein said reed elements are of paramagnetic material and establish a transverse gap relationship between their overlapped ends in the presence of a first environmental magnetic condition in which said reeds do not conduct sufficient magnetic flux to close said gap, (d) wherein said reed elements coact for actuation into a second relationship of gap closure in the presence of a second environmental magnetic condition in which said reeds define a gap-free path of magnetic-flux construction, and (e) wherein optical-fiber lengths have adjacent ends which are carried by the respective reed elements, said method comprising: mounting said reed elements to their respective pedestals in a magnetic-field environment of lesser strength than said second envionmental magnetic condition, said mounting being such as to establish a predetermined transverse gap at the overlapped ends, then subjecting said base to stressed compliant bending deformation in the direction and to the extent sufficient while applying a magnetic field to the reeds to reduce said transverse gap to zero, selecting a single elongate optical fiber and bonding the same to corresponding surfaces of both reed elements, while providing a longitudinal space between fiber bondings to the respective reed elements, inducing a transverse fracture of said single optical fiber within the span of said longitudinal space, then removing the applied magnetic field to thereby force the reed elements to separate, breaking the fiber at the transverse fracture with attendant reestablishment of the transverse gap, and then removing the bending stress whereby said base is compliantly restored to deformed condition with attendant establishment of a longitudinal gap between the fractured fiber ends.

2. The method of claim 1, in which said fracture is induced by a local scar of said fiber at the region of desired fracture, and in which the fracture is caused to proceed by a transverse force applied to at lesat one of the reeds.

3. The method of claim 1, in which optical-fiber bonding to said corresponding surfaces is continuous to a predetermined point, for at lesat one of said reed elements, which point is near but at longitudinal offset from the adjacent ends of said corresponding surfaces; and in which the transverse fracture is induced within said longitudinal offset, the fiber-supporting surface reed element having said longitudinal offset being the surface away from which the corresponding surface of the other reed element is displaced for the gap relationship of said overlapped ends.

4. The method of making an optical-fiber switch (a) wherein two longitudinally spaced upstanding pedestals are mounted to an elongate base which is stiffly compliant and which is therefore adapted for transient bending formation, (b) wherein two separate elongate reed elements of rectangular section have cantilevered mounting to each of said pedestals with notched reduction to substantially one half their respective rectangular sections at a central region of cantilevered ends of said reed elements, (c) wherein said reed elements are of paramagnetic material and establish a transverse gap relationship between their overlapped ends in the presence of a first environmental magnetic condition in which said reeds do not conduct sufficient magnetic flux to close said gap, (d) wherein said reed elements coact for actuation into a second relationship of gap closure in the presence of a second environmental magnetic condition in which said reeds define a gap-free path of magnetic-flux conduction, and (e) wherein optical-fiber lengths have adjacent ends which are carried by the respective reed elements, said method comprising: mounting said elements to their respective pedestals in a magnetic-field environment of lesser strength than said second environmental magnetic condition, said mounting being such as to establish a predetermined transverse gap at the region of overlap, then subjecting said base to stressed compliant bending deformation in the direction and to the extent sufficient to increase said overlap by a predetermined amount, applying a sufficient magnetic field to establish the second environmental magnetic condition to reduce said transverse gap to zero, selecting a single elongate optical fiber and bonding the same to both said elements on a single longitudinal alignment, with a longitudinal space provided between fiber bonds to the respective elements, inducing a transverse fracture of said single optical fiber within the span of said longitudinal space, and then removing the magnetic field and the bending stress with attendant (1) re-establishment of said predetermined transverse gap and (2) establishment between fiber ends of a longitudinal gap equal to said predetermined amount.

5. The method of making an optical-fiber switch wherein two magnetic-reed elements have longitudinally remmote outer ends of cantilevered support and adjacent ends which overlap and which (a) define a transverse gap between the lapped ends in the circumstance of a first magnetic environment and (b) close said gap in the circumstance of a second magnetic environment, and wherein optical-fiber lengths have adjacent ends which are carried by the respective reed elements and which are displaced between (c) a first relation of longitudinally spaced confronting axial alignment in the circumstance of one of said magnetic environments and (d) a second relation of longitudinally spaced confronting axial misalignment in the circumstance of the other of said magnetic environments, which method comprises providing a stiffly compliantly bendable elongate base with spaced cantilevered support of the respective remote outer ends of said magnetic-reed elements, applying force to compliantly bend said base to incrementally increase said longitudinally overlap in the circumstance of one of said magnetic environments, selecting a single optical fiber and bonding the same at spaced locations to each of the respective magnetic-reed elements, fracturing the single optical fiber between the bonded locations, and releasing said force to thereby establish a longitudinally spaced relation between adjacent ends of the fractured single optical fiber.

* * * * *